United States Patent
Suzuki

(10) Patent No.: US 8,354,822 B2
(45) Date of Patent: Jan. 15, 2013

(54) POWER MANAGEMENT SYSTEM AND POWER MANAGEMENT METHOD

(75) Inventor: Naoto Suzuki, Fujinomiya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 223 days.

(21) Appl. No.: 12/967,372

(22) Filed: Dec. 14, 2010

(65) Prior Publication Data

US 2011/0140659 A1 Jun. 16, 2011

(30) Foreign Application Priority Data

Dec. 14, 2009 (JP) ................................. 2009-282657

(51) Int. Cl.
*H01M 10/46* (2006.01)
(52) U.S. Cl. ...................................................... 320/109
(58) Field of Classification Search .................. 320/104, 320/107, 109, 132, 149; 414/266, 269; 180/65.1, 180/65.21
See application file for complete search history.

(56) References Cited

U.S. PATENT DOCUMENTS

2010/0225271 A1* 9/2010 Oyobe et al. .................. 320/108
2010/0277121 A1* 11/2010 Hall et al. ..................... 320/108

FOREIGN PATENT DOCUMENTS

| JP | 05207668 A | 8/1993 |
|---|---|---|
| JP | 05336673 A | 12/1993 |
| JP | 2001-069678 A | 3/2001 |
| JP | 20011069678 A | 3/2001 |
| JP | 2004229355 A | 8/2004 |

OTHER PUBLICATIONS

Decision to Grant from JP 2009-282657 dated Dec. 27, 2011; 5 pgs.

* cited by examiner

*Primary Examiner* — Edward Tso
(74) *Attorney, Agent, or Firm* — Gifford, Krass, Sprinkle, Anderson & Citkowski, P.C.

(57) ABSTRACT

A power management system is a system for performing power management on a management subject apparatus that includes a charging unit for charging a storage apparatus installed in a vehicle. The power management system includes: a detection unit that detects a power consumed by the management subject apparatus; an adjustment unit that adjusts a charging power charged to the vehicle from the charging unit; and a control unit that controls the adjustment unit. The control unit determines an allowable power that can be supplied to the vehicle from the charging unit, notifies the vehicle of the allowable power, and controls the adjustment unit such that a power transmitted to the vehicle is reduced when a response to the notification of the allowable power is not received. With the system according to the invention, restrictions on charging subject vehicles can be alleviated without increasing a charging capacity of a charging facility.

8 Claims, 6 Drawing Sheets

POWER MANAGEMENT SYSTEM AND POWER MANAGEMENT METHOD

CROSS-REFERENCE TO RELATED APPLICATIONS

This application claims priority to Japanese Patent Application No. 2009-282657 filed on Dec. 14, 2009, and which is incorporated herein by reference in its entirety, including the specification, drawings and abstract.

BACKGROUND OF THE INVENTION

1. Field of the Invention

The invention relates to a power management system and a power management method, and more particularly to a power management system and a power management method for performing power management on a management subject apparatus that includes a charging unit for charging a storage apparatus installed in a vehicle.

2. Description of the Related Art

In an electric automobile and a plug-in hybrid automobile, a storage battery is charged from a commercial power supply in a household or the like. Japanese Patent Application Publication No. 5-207668 (JP-A-5-207668) discloses a technique with which a secondary battery of an electric automobile or the like can be charged rapidly while leveling a load applied to an alternating current power supply side. Normally, a direct current power having a low current is obtained from an alternating current power supply by a rectifier and a charger and charged to a facility storage battery. When a charging request is issued from the electric automobile or the like, a direct current power having a large current is obtained from the storage battery by the charger and rapidly charged to a storage battery of the electric automobile or the like.

However, with the technique disclosed in JP-A-5-207668, a vehicle issues a charging request to a charging facility in order to set the charging facility in a charge mode. When a vehicle that is not capable of communicating this type of charging request appears, a load applied to the alternating current power supply side cannot be leveled, and therefore a charging capacity on the charging facility side must be increased.

Further, depending on the facility storage battery that levels the load, the size of the charging facility may increase, leading to an increase in cost.

SUMMARY OF INVENTION

The invention provides a power management system and a power management method with which restrictions on charging subject vehicles can be alleviated without increasing a charging capacity of a charging facility.

A first aspect of the invention is a power management system for performing power management on a management subject apparatus that includes a charging unit for charging a storage apparatus installed in a vehicle, including: a detection unit that detects a power consumed by the management subject apparatus; an adjustment unit that adjusts a charging power charged to the vehicle from the charging unit; and a control unit that controls the adjustment unit. The control unit determines an allowable power that can be supplied to the vehicle from the charging unit, notifies the vehicle of the allowable power, and controls the adjustment unit such that a power transmitted to the vehicle is reduced when a response to the notification of the allowable power is not received.

A second aspect of the invention is a power management method for performing power management on a management subject apparatus that includes a charging unit for charging a storage apparatus installed in a vehicle, including: detecting a power consumed by the management subject apparatus; determining an allowable power that can be supplied to the vehicle from the charging unit; notifying the vehicle of the allowable power; and adjusting a charging power transmitted to the vehicle from the charging unit such that the charging power is reduced when a response to the notification of the allowable power is not received.

According to the invention, charging can be performed even on a vehicle that does not conform to a standard without increasing a charging capacity of a charging facility more than necessary.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Embodiments of the invention will be described in detail below with reference to the drawings. Note that identical or corresponding parts of the drawings have been allocated identical reference symbols, and description thereof will not be repeated.

Figure 1:
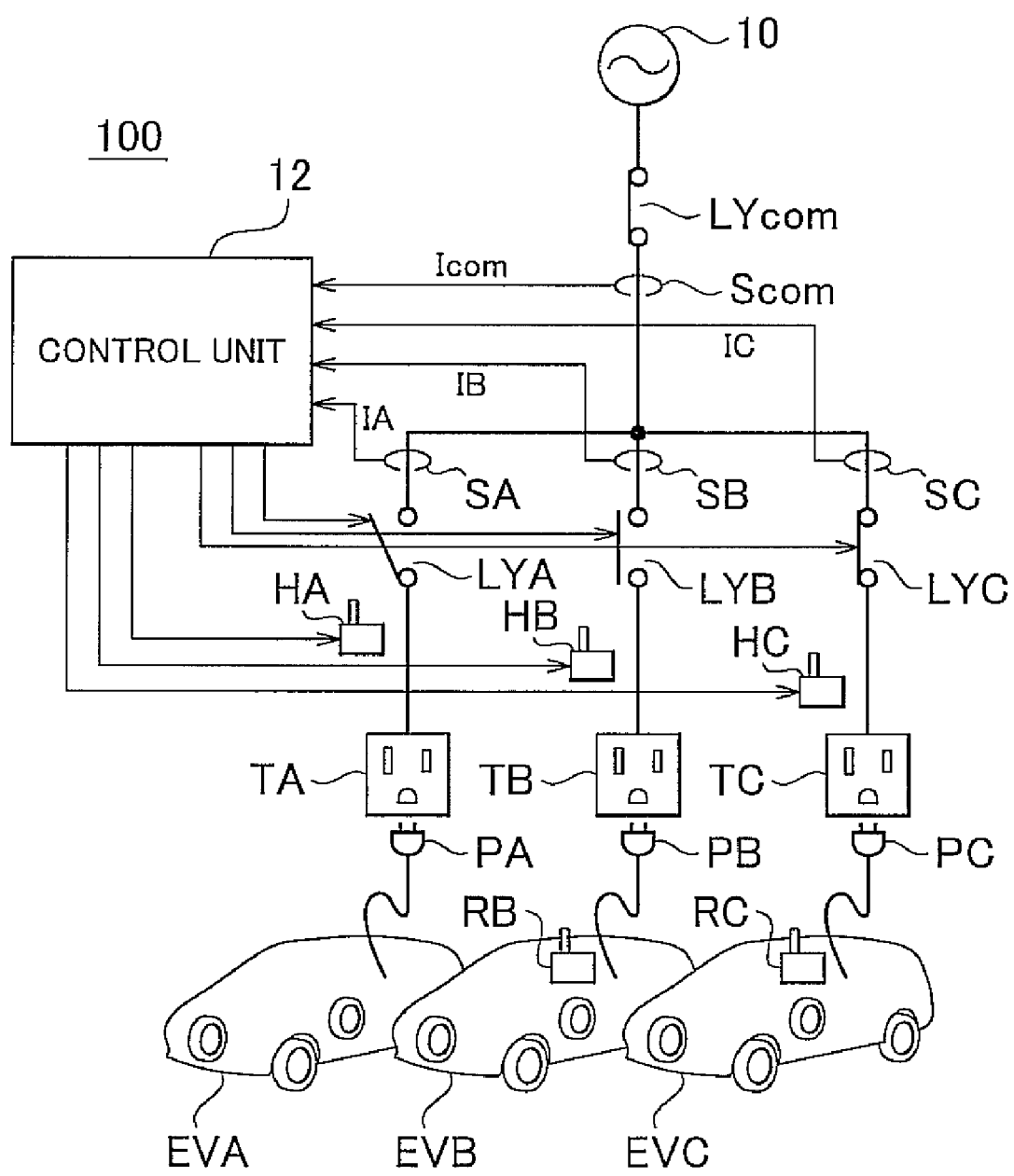
FIG. 1 is a view showing the constitution of a power management system according to a first embodiment.

FIG. 1 is a view showing the constitution of a power management system according to a first embodiment. In the first embodiment, when charging is performed on a plurality of vehicles such as electric automobiles and the vehicles are installed with an apparatus for controlling a charging power, the vehicles are caused to adjust the charging power. For this purpose, first, an attempt is made to execute charging power control through communication. However, when the vehicles are not installed with an apparatus for controlling the charging power or do not respond to the communication, the control is switched such that the vehicles are charged in a time-sharing manner.

Referring to FIG. 1, a power charging system 100 includes a commercial power supply 10, a breaker LYcom, relays LYA, LYB, LYC, wireless communication apparatuses HA, HB, HC, current sensors Scom, SA, SB, SC, plug sockets TA, TB, TC, and a control unit 12.

The power management system 100 is disposed in a location where a plurality of vehicles need to be charged simultaneously, for example a shopping center or an apartment building. The breaker LYcom is a breaker for interrupting a common power supply. When a current that exceeds a current determined by a contract with a power company flows, the breaker LYcom is interrupted automatically. The current sensor Scom detects a total current Icom flowing to the plug sockets TA, TB, TC and transmits the detected total current Icom to the control unit 12.

The relay LYA switches the plug socket TA between power conduction and power interruption. The current sensor SA detects a current IA flowing to the plug socket TA and transmits the detected current IA to the control unit 12.

The relay LYB switches the plug socket TB between power conduction and power interruption. The current sensor SB detects a current IB flowing to the plug socket TB and transmits the detected current IB to the control unit 12.

The relay LYC switches the plug socket TC between power conduction and power interruption. The current sensor SC detects a current IC flowing to the plug socket TC and transmits the detected current IC to the control unit 12.

The wireless communication apparatuses HA, HB, HC are used to notify the vehicles of an allowable charging power. When the vehicle has a communication function and is installed with an apparatus for controlling the charging power, the control unit 12 can adjust a total charging power of the plurality of vehicles so that the total charging power does not exceed a contract capacity by notifying the vehicles of the allowable charging power using the wireless communication apparatuses HA, HB, HC.

Note that communicating means need not be wireless and may use a dedicated signal line or power line communication instead.

FIG. 1 shows a state in which plugs PA, PB, PC are inserted into the plug sockets TA, TB, TC, respectively. The plugs PA, PB, PC are for supplying charging power to vehicles EVA, EVB, EVC, respectively. The vehicles EVB, EVC are installed with wireless communication apparatuses RB, RC, respectively, but the vehicle EVA is not installed with a wireless communication apparatus.

Under these conditions, when the current Icom exceeds a predetermined value, the control unit 12 performs control such that the vehicles EVB, EVC are charged preferentially and the vehicle EVA is charged once charging of the vehicle EVB or the vehicle EVC is complete.

Figure 2:
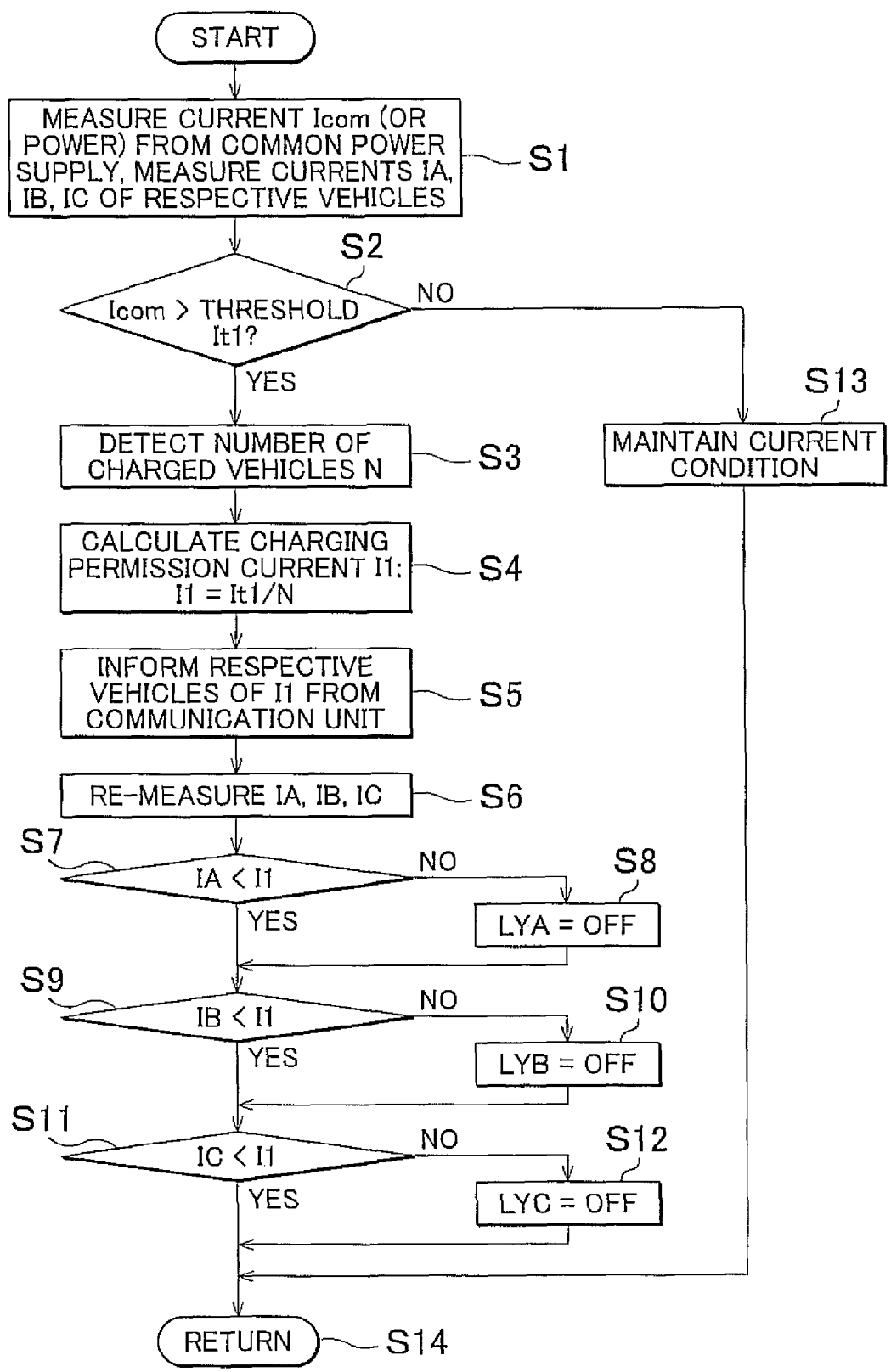
FIG. 2 is a first flowchart illustrating power management control executed by a control unit 12 shown in FIG. 1.

FIG. 2 is a first flowchart illustrating power management control executed by the control unit 12 shown in FIG. 1. The processing of this flowchart is called up from a predetermined main routine and executed at fixed time intervals or when a predetermined condition is established. In the processing of this flowchart, control is executed to switch the relays ON.

Referring to FIGS. 1 and 2, first, in step S1, the control unit 12 measures the current Icom (or power) from the common power supply and measures the currents IA, IB, IC of the respective vehicles. Here, a voltage from the commercial power supply is fixed (at 100V or 200V in Japan, for example), and therefore, by measuring the current, the charging power can be determined through calculation. Further, the charging power can be adjusted by adjusting a charging current to or below a contract current. Hence, the respective current sensors also operate as detection units for detecting the power.

Next, in step S2, the control unit 12 determines whether or not the current Icom is larger than a threshold It1. The threshold It1 is a value no greater than a contract current value, but may be set to have a certain amount of leeway relative to the contract current.

When the current Icom does not exceed the threshold It1 in step S2, the processing advances to step S13, in which a current charging condition is maintained, whereupon the control is shifted to the main routine in step S14.

When the current Icom exceeds the threshold It1 in step S2, the processing advances to step S3. In step S3, a number of charged vehicles N is detected. Vehicle connection can be detected by providing the respective plug sockets TA, TB, TC with sensors that detect plug insertion or by activating the relays LYA, LYB, LYC and determining whether or not the currents IA, IB, IC flow.

Next, in step S4, a charging permission current I1 is calculated using a following Equation (1).

$$I1 = It1/N \tag{1}$$

In step S5, the control unit 12 notifies the respective vehicles of the charging permission current I1. The control unit 12 notifies the vehicles using the wireless apparatuses HA, HB, HC but may notify the vehicles using a separate communication line or through power line communication.

Next, in step S6, the control unit 12 re-measures the currents IA, IB, IC to check whether the charging current has been reduced on the vehicle side in response to notification of the charging permission current I1.

Next, in step S7, a determination is made as to whether or not the current IA has fallen below the charging permission current I1. When the current IA is not smaller than the charging permission current I1, the processing advances to step S8, in which the relay LYA is switched OFF such that charging of the vehicle EVA is interrupted, whereupon the processing advances to step S9. When the current IA has fallen below the charging permission current I1 in step S7, the processing advances to step S9.

In step S9, a determination is made as to whether or not the current IB has fallen below the charging permission current I1. When the current IB is not smaller than the charging permission current I1, the processing advances to step S10, in which the relay LYB is switched OFF such that charging of the vehicle EVB is interrupted, whereupon the processing advances to step S11. When the current IB has fallen below the charging permission current I1 in step S9, the processing advances to step S11.

In step S11, a determination is made as to whether or not the current IC has fallen below the charging permission current I1. When the current IC is not smaller than the charging permission current I1, the processing advances to step S12, in which the relay LYC is switched OFF such that charging of the vehicle EVC is interrupted, whereupon the processing advances to step S14. When the current IC has fallen below the charging permission current I1 in step S11, the processing advances to step S14.

Note that in a case where time is required to vary the charging current value through vehicle control, the re-measurement of step S6 may be executed after waiting for a predetermined amount of time following the notification of step S5, or in steps S7, S9 and S11, the control unit 12 may check only that the measurement result is smaller than a previous measurement result.

Figure 3:
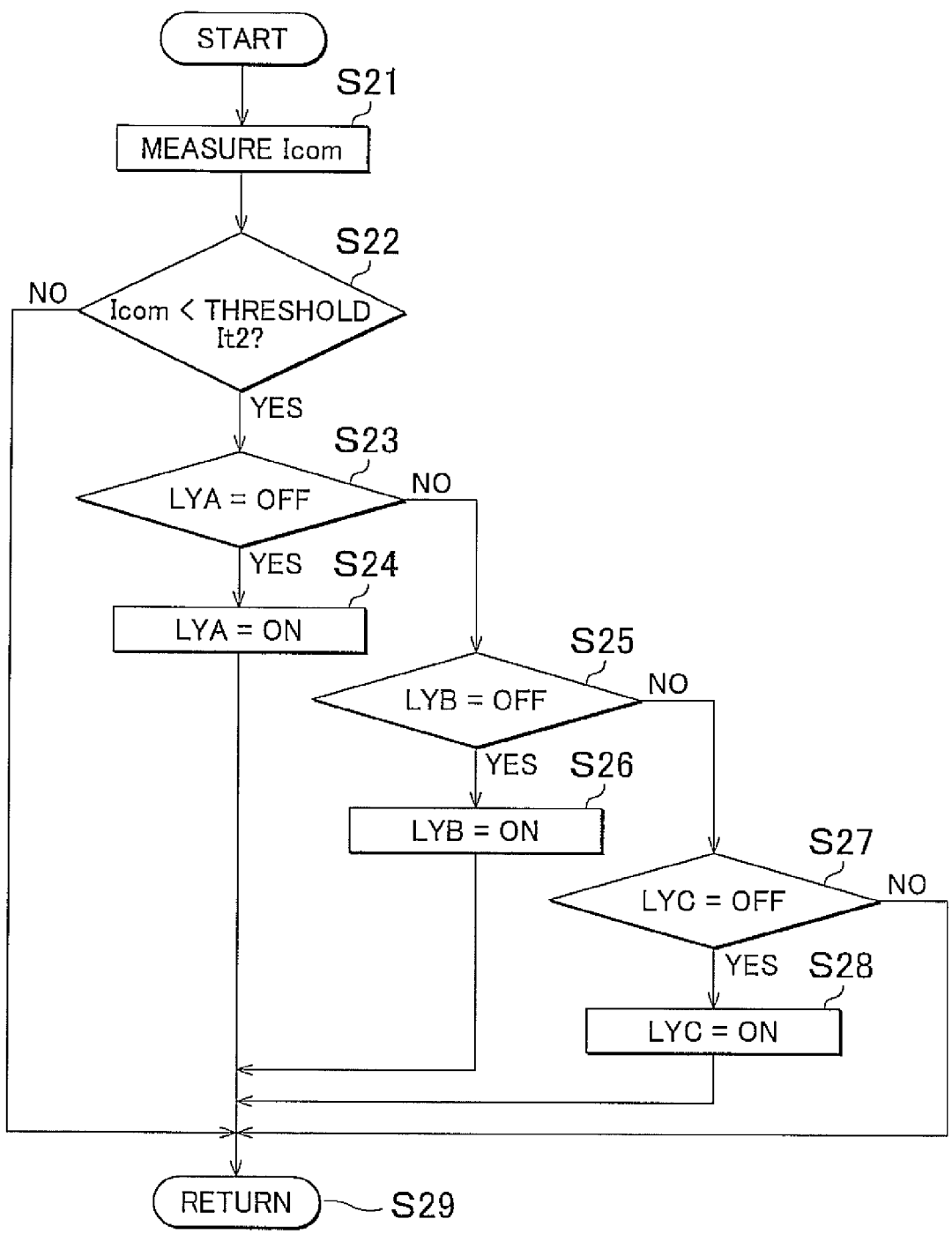
FIG. 3 is a second flowchart illustrating the power management control executed by the control unit 12 shown in FIG. 1.

In step S14, the control is shifted to the main routine. FIG. 3 is a second flowchart illustrating the power management control executed by the control unit 12 shown in FIG. 1. The processing of this flowchart is called up from the predetermined main routine and executed at fixed time intervals or when a predetermined condition is established. In the processing of this flowchart, the relays switched OFF during the control of FIG. 2 are switched ON.

Referring to FIGS. 1 and 3, first, in step S21, the current Icom is measured. Next, in step S22, the control unit 12 determines whether or not the current Icom is smaller than a threshold It2. The threshold It2 may be set at a smaller value than the threshold It1 used in step S2 of FIG. 2. By providing an appropriate difference between the thresholds, a situation in which the relays are switched ON and OFF frequently and repeatedly can be prevented.

When the current Icom is not smaller than the threshold It2 in step S22, the processing advances to step S29, in which the current charging condition is maintained, whereupon the control is shifted to the main routine.

When the current Icom is smaller than the threshold It2 in step S22, on the other hand, the processing advances to step S23. In step S23, a determination is made as to whether or not the relay LYA is OFF. When the relay LYA is OFF in step S23, the relay LYA is switched ON in step S24.

When the relay LYA is not OFF in step S23, the processing advances to step S25. In step S25, a determination is made as to whether or not the relay LYB is OFF. When the relay LYB is OFF in step S25, the relay LYB is switched ON in step S26.

When the relay LYB is not OFF in step S25, the processing advances to step S27. In step S27, a determination is made as to whether or not the relay LYC is OFF. When the relay LYC is OFF in step S27, the relay LYC is switched ON in step S28.

When the relay LYC is not OFF in step S27, the processing advances to step S29. The processing also advances to step S29 when the relay setting is modified to ON in any of steps S24, S26, S28. In step S29, the control is shifted to the main routine. By repeating the processing of this flowchart several times, all of the relays LYA, LYB, LYC can be returned to an ON state.

Figure 4:
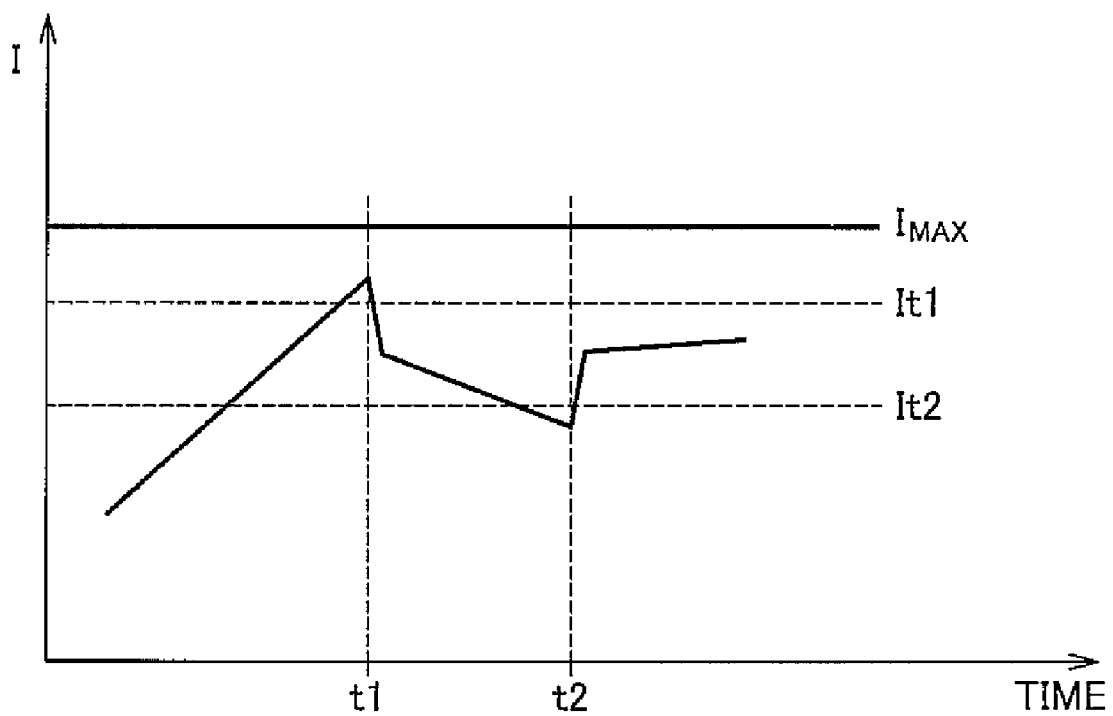
FIG. 4 is a waveform diagram showing an example of variation in a charging current.

FIG. 4 is a waveform diagram showing an example of variation in the charging current. Referring to FIG. 4, the current Icom increases up to a time t1, and when the current Icom exceeds the threshold It1, power transmission to the vehicle EVA unable to respond to communication is interrupted. From the time t1 to a time t2, the vehicles EVB, EVC are charged. When the charging progresses such that the current falls below the threshold It2, power transmission to the vehicle EVA is resumed at the time t2, and therefore the current increases.

According to the first embodiment, charging can be performed simultaneously on a plurality of vehicles without exceeding a contract capacity even when a vehicle with which communication cannot be established exists within the plurality of vehicles.

In a second embodiment, an example in which a vehicle is charged and another electric load is used in a power management system having a fixed contract capacity and disposed in a household, for example, will be described.

Figure 5:
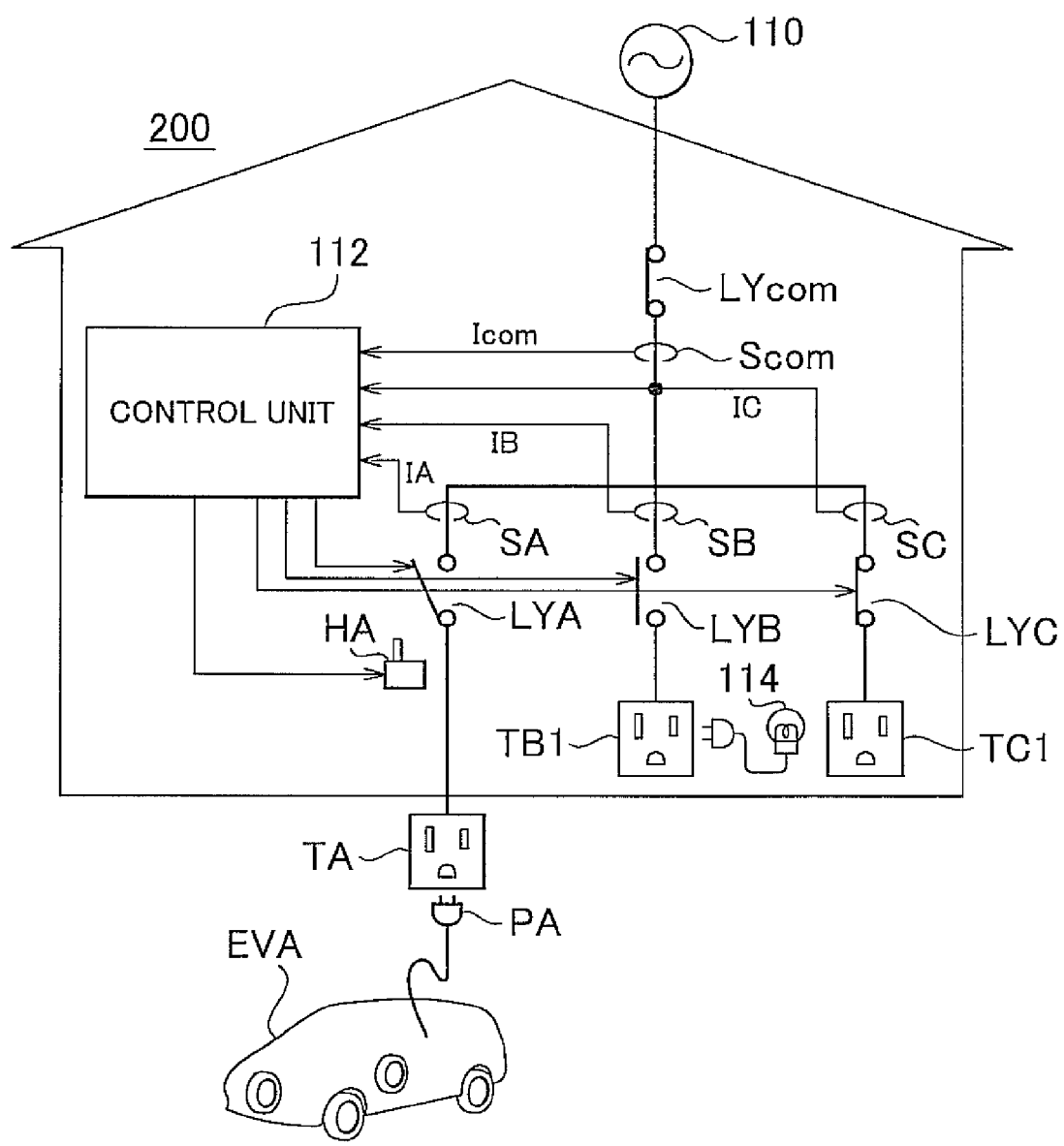
FIG. 5 is a view showing the constitution of a power management system 200 according to a second embodiment.

FIG. 5 is a view showing the constitution of a power management system 200 according to the second embodiment. Referring to FIG. 5, the power management system 200 includes a commercial power supply 110, a breaker LYcom, relays LYA, LYB, LYC, a wireless communication apparatus HA, current sensors Scom, SA, SB, SC, plug sockets TA, TB1, TC1, and a control unit 112.

The power management system 200 is disposed in a location such as a typical household, for example, where vehicle charging and use of a typical electric load (a light, an air-conditioner, a television, and so on, for example) must be performed simultaneously. The plug socket TA is disposed outdoors, for example, and used to charge a vehicle EVA. The plug sockets TB1, TC1 are disposed indoors and used to supply power to a typical electric load such as a light 114.

The breaker LYcom is a breaker for interrupting a common power supply. The current sensor Scom detects a total current Icom flowing to the plug sockets TA, TB1, TC1 and transmits the detected total current Icom to the control unit 112.

The relay LYA switches the plug socket TA between power conduction and power interruption. The current sensor SA detects a current IA flowing to the plug socket TA and transmits the detected current IA to the control unit 112.

The relay LYB switches the plug socket TB1 between power conduction and power interruption. The current sensor SB detects a current IB flowing to the plug socket TB1 and transmits the detected current IB to the control unit 112.

The relay LYC switches the plug socket TC1 between power conduction and power interruption. The current sensor SC detects a current IC flowing to the plug socket TC1 and transmits the detected current IC to the control unit 112.

The wireless communication apparatus HA is used to notify the vehicle of an allowable charging power. When the vehicle has a communication function and is installed with an apparatus for controlling the charging power, the control unit 112 can adjust a sum total of the charging power consumed by the vehicle and the power consumed by the typical electric load so that the sum total does not exceed a contract capacity by notifying the vehicle of the allowable charging power using the wireless communication apparatus HA.

Note that the communicating means need not be wireless and may use a dedicated signal line or power line communication instead.

FIG. 5 shows a state in which the plug PA is inserted into the plug socket TA. The plug PA is for supplying charging power to the vehicle EVA. The vehicle EVA is not installed with a wireless communication apparatus. When a vehicle is installed with a wireless communication apparatus and therefore has a function for limiting the charging power to the power indicated by the control unit 112, charging can be continued without problems. However, when a vehicle not having this function, such as the vehicle EVA, is connected and the current Icom exceeds a predetermined value, the control unit 112 supplies power to the typical electric load preferentially and interrupts charging of the vehicle EVA.

Figure 6:
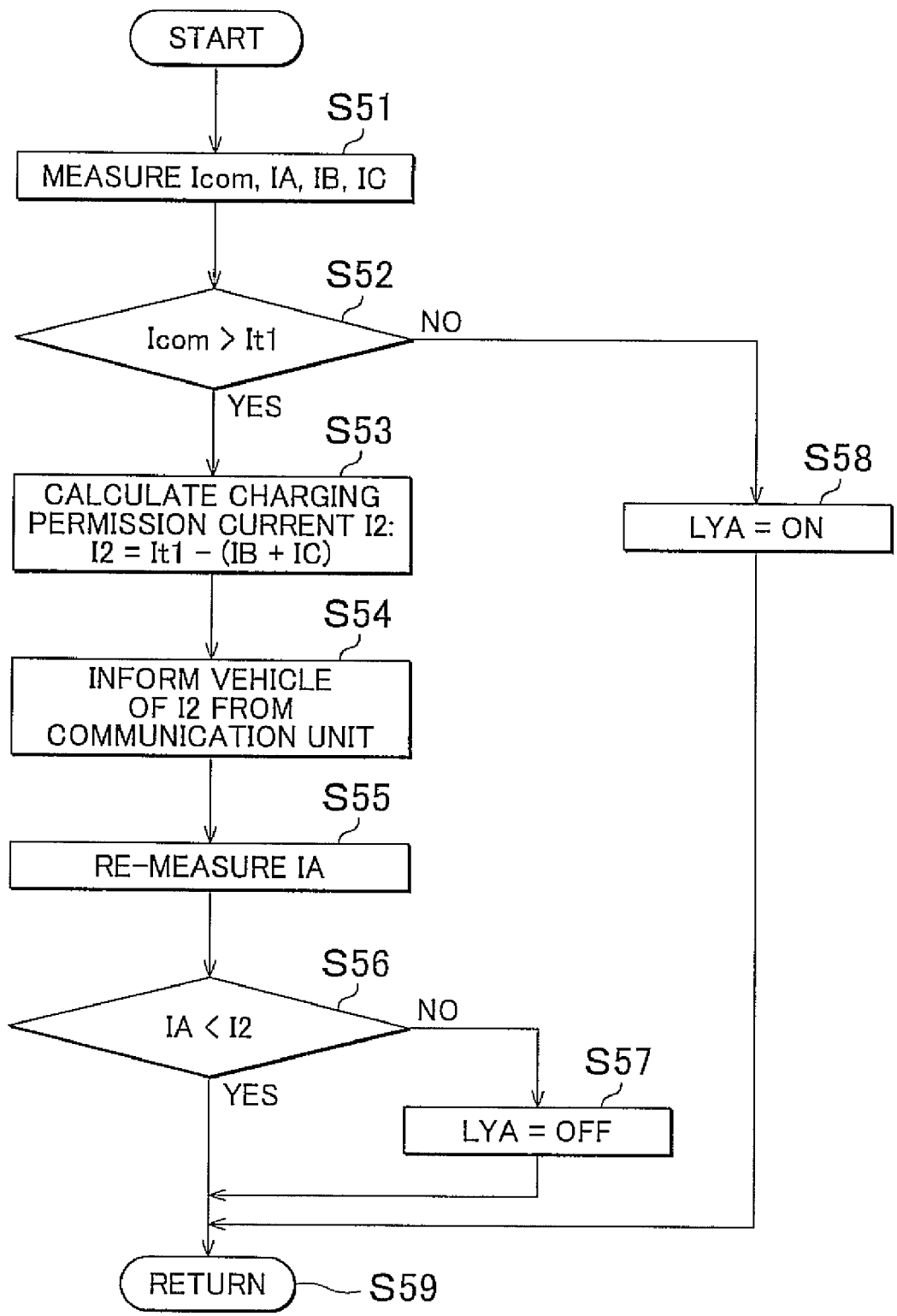
FIG. 6 is a flowchart illustrating power management control executed by a control unit 112 shown in FIG. 5.

FIG. 6 is a flowchart illustrating power management control executed by the control unit 112 shown in FIG. 5. The processing of this flowchart is called up from a predetermined main routine and executed at fixed time intervals or when a predetermined condition is established.

Referring to FIGS. 5 and 6, first, in step S51, the control unit 112 measures the current Icom (or power) from the common power supply and measures the respective currents IA, IB, IC. Here, the voltage from the commercial power supply is fixed (at 100V or 200V in Japan, for example), and therefore, by measuring the current, the charging power can be determined through calculation. Further, the charging power can be adjusted by adjusting the charging current to or below the contract current. Hence, the respective current sensors also operate as detection units for detecting the power.

Next, in step S52, the control unit 112 determines whether or not the current Icom is larger than a threshold It1. The threshold It1 is a value no greater than the contract current value, but may be set to have a certain amount of leeway relative to the contract current.

When the current Icom does not exceed the threshold It1 in step S52, the processing advances to step S58, in which the relay LYA is switched ON, whereupon the control is shifted to the main routine in step S59.

When the current Icom exceeds the threshold It1 in step S52, the processing advances to step S53. In step S53, a charging permission current I2 is calculated. The charging permission current 12 is calculated using a following Equation (2).

$$I2 = It1 - (IB + IC) \tag{2}$$

In step S54, the control unit 112 notifies the vehicle of the charging permission current I2. The control unit 112 notifies the vehicle using the wireless apparatus HA but may notify the vehicle using a separate communication line or through power line communication.

Next, in step S55, the control unit 112 re-measures the current IA to check whether the charging current has been reduced on the vehicle side in response to notification of the charging permission current I2.

Next, in step S56, a determination is made as to whether or not the current IA has decreased. When the current IA has not decreased below the value measured in step S51, the processing advances to step S57, in which the relay LYA is switched OFF such that charging of the vehicle EVA is interrupted, whereupon the processing advances to step S59. When the current IA has decreased in step S56, the processing advances to step S59. In step S59, the control is shifted to the main routine.

As described above, in the second embodiment, an electric automobile or the like can be charged without increasing a household contract capacity more than necessary.

Finally, the first and second embodiments will be summarized with reference to the drawings. The power management systems 100, 200 are systems for performing power management on a management subject apparatus that includes a charging unit for charging a storage apparatus installed in a vehicle. As shown in FIG. 1, the power management system 100 includes: a detection unit (the current sensors Scom, SA, SB, SC) that detects a power consumed by the management subject apparatus; an adjustment unit (the relays LYA, LYB, LYC) that adjusts a charging power charged to the vehicle from the charging unit (the plug sockets TA, TB, TC); and the control unit 12 that controls the adjustment unit. As shown by steps S4 and S5 in FIG. 2, the control unit 12 determines an allowable power (I1×supply voltage) that can be supplied to the vehicle from the charging unit, notifies the vehicle of the allowable power, and controls the adjustment unit such that a power transmitted to the vehicle is reduced when a response to the notification of the allowable power is not received (NO in steps S7, S9, S11).

Preferably, when a sum total of a power consumed by the management subject apparatus does not exceed the predetermined threshold It1 (NO in step S2), the control unit 12 controls the adjustment unit such that the charging power charged to the vehicle is not limited irrespective of whether or not a response to the notification of the allowable power is received (step S13), and when the sum total of the power consumed by the management subject apparatus exceeds the predetermined threshold (YES in step S2), the control unit 12 issues a request to the vehicle connected to the charging unit to reduce the charging power by notifying the vehicle of the allowable power (step S5).

More preferably, the charging unit (the plug sockets TA, TB, TC) is constituted to be capable of charging a plurality of vehicles EVA, EVB, EVC, the adjustment unit includes a plurality of power interruption units (the relays LYA, LYB, LYC) corresponding respectively to the plurality of vehicles, the detection unit (the current sensors SA, SB, SC) is capable of detecting a power supplied to the plurality of vehicles from the charging unit in relation to each of the plurality of vehicles, and the control unit 12 controls the plurality of power interruption units such that of the plurality of vehicles, a vehicle EVB, EVC that responds to the notification of the allowable power is charged preferentially over a vehicle EVA that does not respond to the notification of the allowable power.

Even more preferably, the control unit 12 causes the power interruption unit (the relay LYA) corresponding to the vehicle EVA that did not respond to the notification of the allowable power to interrupt the power, re-determines the allowable power, and re-notifies the vehicle that responded to the notification of the allowable power. More specifically, when the flowchart of FIG. 2 is executed once, the relay LYA is interrupted. When the flowchart is executed for a second time, the number of charged vehicles N in step S3 is reduced by one, and therefore the charging permission current I1 increases. The vehicles EVB, EVC are then charged on the basis of this charging permission current I1.

More preferably, as shown in FIGS. 5 and 6, the detection unit (the current sensor SA) is capable of detecting a power transmitted to the vehicle from the charging unit (the plug socket TA), the adjustment unit includes a power interruption unit (the relay LYA) that interrupts transmission of the power, and the control unit 112 causes the power interruption unit to interrupt power transmission to the vehicle EVA from the charging unit (step S57) when the power (IA×supply voltage) transmitted to the vehicle EVA does not vary (NO in step S56) even after the allowable power I2 is modified in steps S53 and S54.

More preferably, the detection unit (the current sensor SA) is capable of detecting a power transmitted to the vehicle from the charging unit (the plug socket TA), the adjustment unit includes a power interruption unit (the relay LYA) that interrupts transmission of the power, and the control unit causes the power interruption unit to interrupt power transmission to the vehicle from the charging unit (step S57) when the power (IA×supply voltage) transmitted to the vehicle exceeds the allowable power I2 (NO in step S56).

More preferably, as shown in FIG. 5, the management subject apparatus further includes a power supply unit (the plug sockets TB1, TC1) capable of supplying power to an electric load other than the vehicle, and the control unit 112 controls the adjustment unit such that a sum total (Icom× supply voltage) of a power consumed by the charging unit and the power supply unit does not exceed a predetermined value.

Preferably, a power is supplied to the management subject apparatus at a predetermined voltage (100V or 200V in Japan, for example), and the detection unit measures a current (Icom, IA, IB, IC) in order to detect the power of the management subject apparatus.

The embodiments disclosed here are examples in all respects and are not to be considered as limitations of the invention. The scope of the invention is defined by the scope of the claims rather than the above description of the embodiments, and includes all modifications having equivalent meaning and scope to the scope of the claims.

What is claimed is:

1. A power management system for performing power management on a management subject apparatus that includes a charging unit for charging a storage apparatus installed in a vehicle, comprising:
    a detection unit that detects a power to the management subject apparatus;
    an adjustment unit that adjusts a charging power charged to the vehicle from the charging unit; and
    a control unit that controls the adjustment unit, wherein
    the control unit determines an allowable power that can be supplied to the vehicle from the charging unit, notifies the vehicle of the allowable power, and controls the adjustment unit such that a power that is transmitted to the vehicle is reduced when a response to the notification of the allowable power is not received.

2. The power management system according to claim 1, wherein:
    when a sum total of the power that is consumed by the management subject apparatus does not exceed a predetermined threshold, the control unit controls the adjustment unit such that the charging power charged to the vehicle is not limited irrespective of whether or not a response to the notification of the allowable power is received; and when the sum total of the power that is consumed by the management subject apparatus exceeds the predetermined threshold, the control unit issues a request to the vehicle connected to the charging unit to reduce the charging power by notifying the vehicle of the allowable power.

3. The power management system according to claim 2, wherein:
the charging unit is constituted to be capable of charging a plurality of vehicles;
the adjustment unit includes a plurality of power interruption units corresponding respectively to the plurality of vehicles;
the detection unit is capable of detecting a power supplied to the plurality of vehicles from the charging unit in relation to each of the plurality of vehicles; and
the control unit controls the plurality of power interruption units such that, of the plurality of vehicles, a vehicle that responds to the notification of the allowable power is charged preferentially over a vehicle that does not respond to the notification of the allowable power.

4. The power management system according to claim 3, wherein the control unit causes the power interruption unit corresponding to the vehicle that has not responded to the notification of the allowable power to interrupt the power, re-determines the allowable power, and re-notifies the vehicle that has responded to the notification of the allowable power, of the re-determined allowable power.

5. The power management system according to claim 2, wherein:
the detection unit is capable of detecting a power that is transmitted to the vehicle from the charging unit;
the adjustment unit includes a power interruption unit that interrupts transmission of the powers; and
the control unit causes the power interruption unit to interrupt power transmission to the vehicle from the charging unit when the power that is transmitted to the vehicle does not vary even after the allowable power is modified.

6. The power management system according to claim 2, wherein:
the detection unit is capable of detecting a power that is transmitted to the vehicle from the charging unit;
the adjustment unit includes a power interruption unit that interrupts transmission of the power; and
the control unit causes the power interruption unit to interrupt power transmission to the vehicle from the charging unit when the power that is transmitted to the vehicle exceeds the allowable power.

7. The power management system according to claim 2, wherein:
the management subject apparatus further comprises a power supply unit capable of supplying power to an electric load other than the vehicle, and
the control unit controls the adjustment unit such that a sum total of a power that is consumed by the charging unit and the power supply unit does not exceed a predetermined value.

8. The power management system according to claim 1, wherein:
a power is supplied to the management subject apparatus at a predetermined voltage; and
the detection unit measures a current in order to detect the power to the management subject apparatus.

* * * * *